Feb. 24, 1942.  O. W. FORSLUND ET AL  2,273,948
DISPENSING APPARATUS
Filed June 10, 1940  7 Sheets-Sheet 1
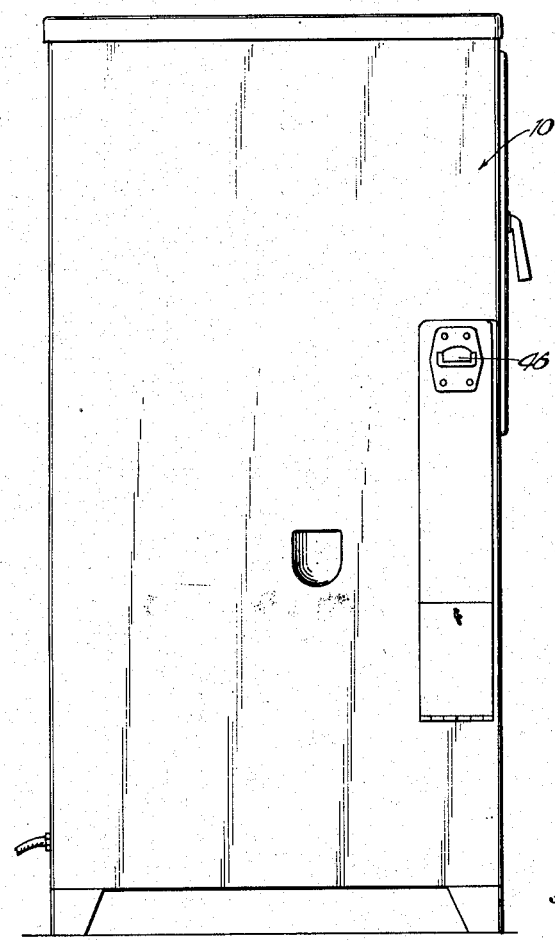
Fig. 1
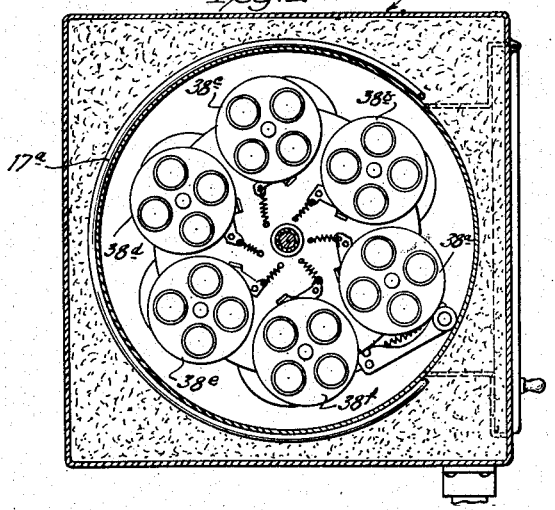
Fig. 2
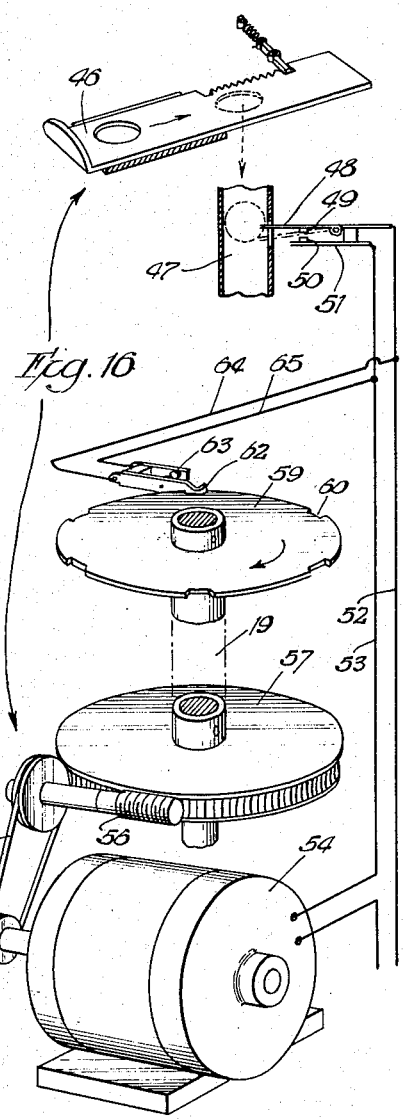
Inventors:
Oscar W. Forslund
William Heyn
By Sheridan, Davis & Cargill
Attys.

Feb. 24, 1942.  O. W. FORSLUND ET AL  2,273,948
DISPENSING APPARATUS
Filed June 10, 1940  7 Sheets-Sheet 2

Inventors
Oscar W. Forslund
William Heyn
BY
Sheridan, Davis & Calgill
Attys.

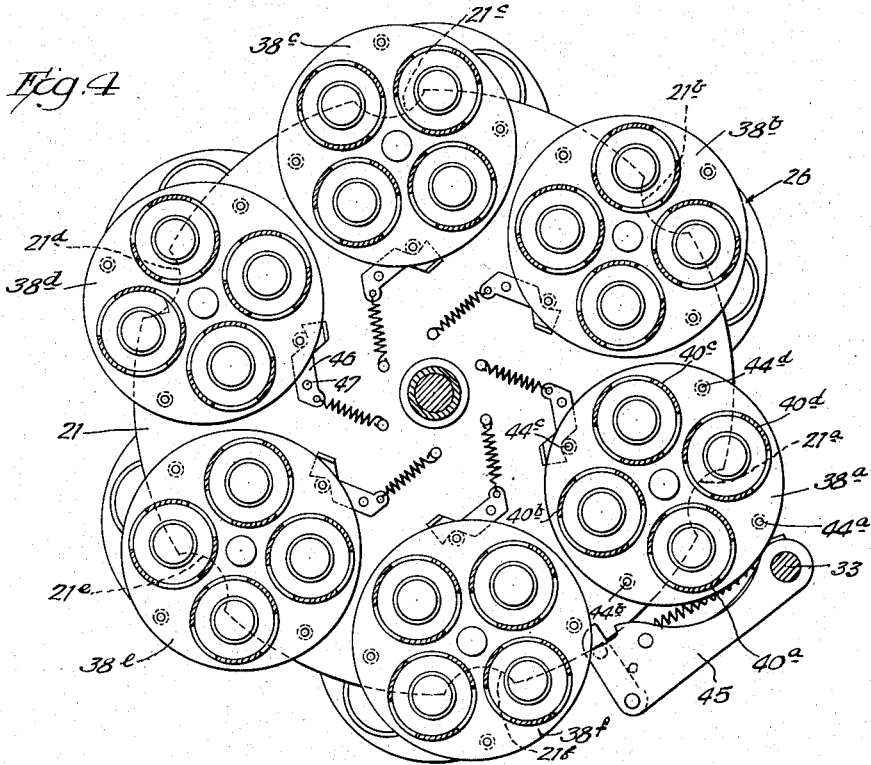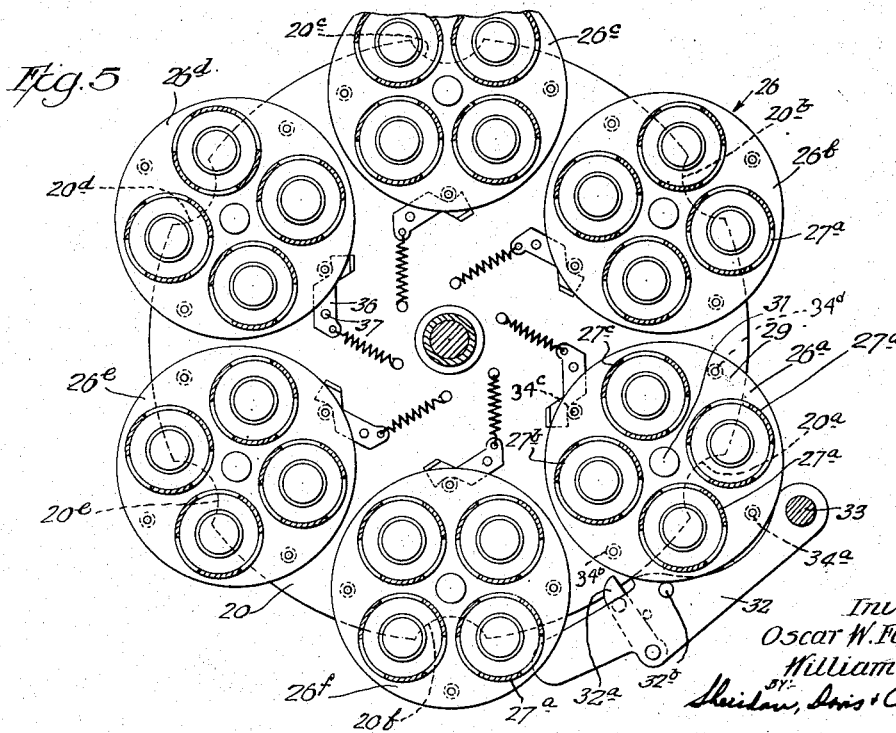

Feb. 24, 1942.   O. W. FORSLUND ET AL   2,273,948
DISPENSING APPARATUS
Filed June 10, 1940   7 Sheets-Sheet 4
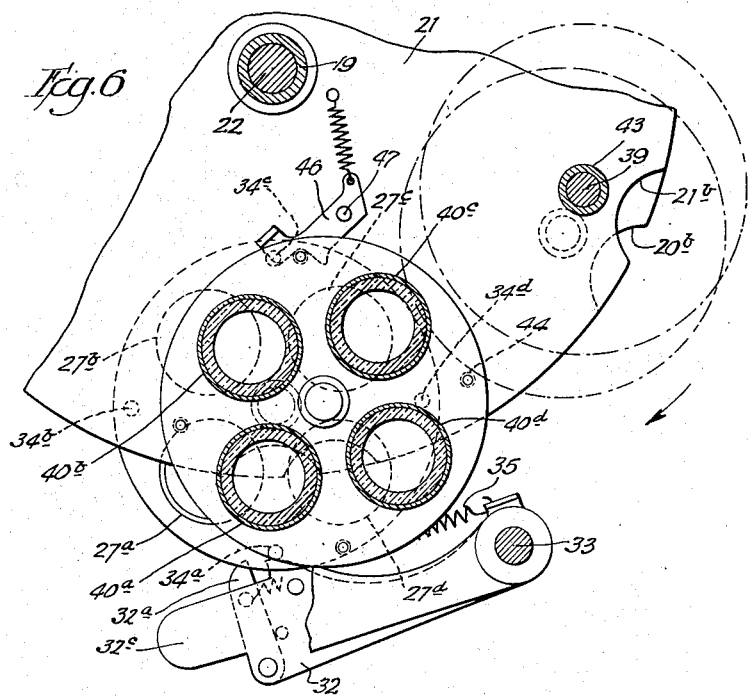
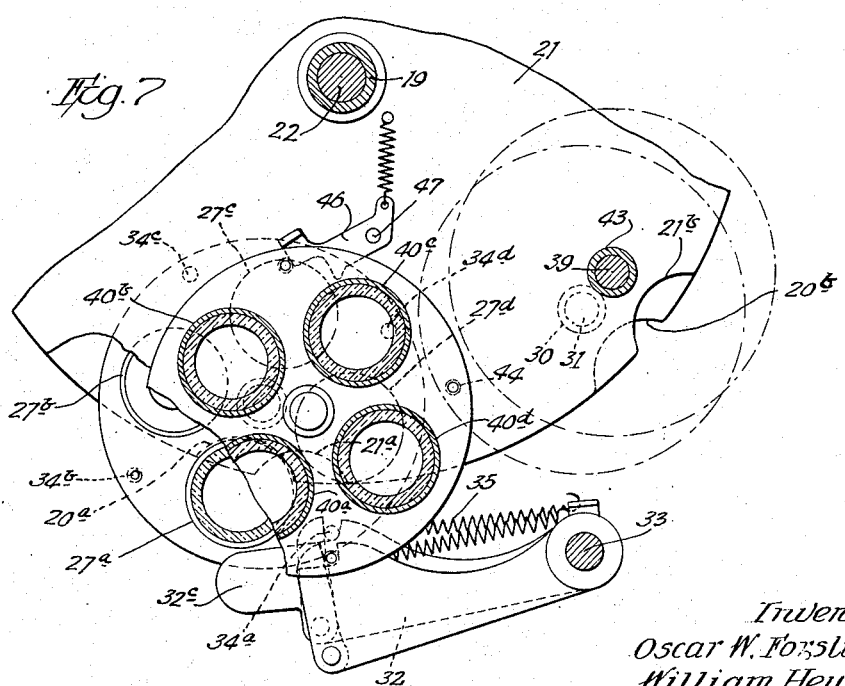
Inventors
Oscar W. Forslund
William Heyn
By: Sheridan, Davis & Cargill
Attys.

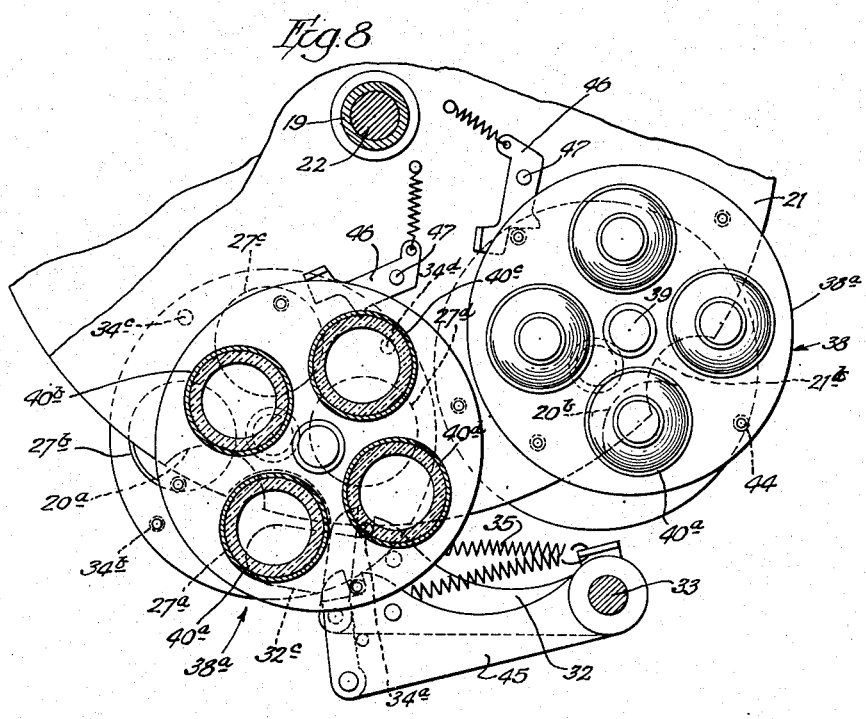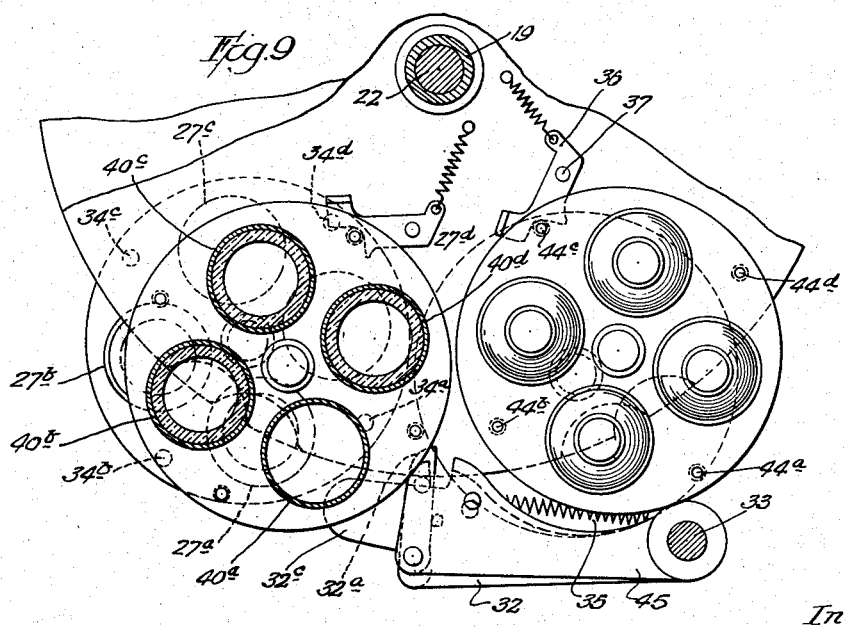

Feb. 24, 1942.                O. W. FORSLUND ET AL                2,273,948
                                DISPENSING APPARATUS
                                Filed June 10, 1940                7 Sheets-Sheet 6
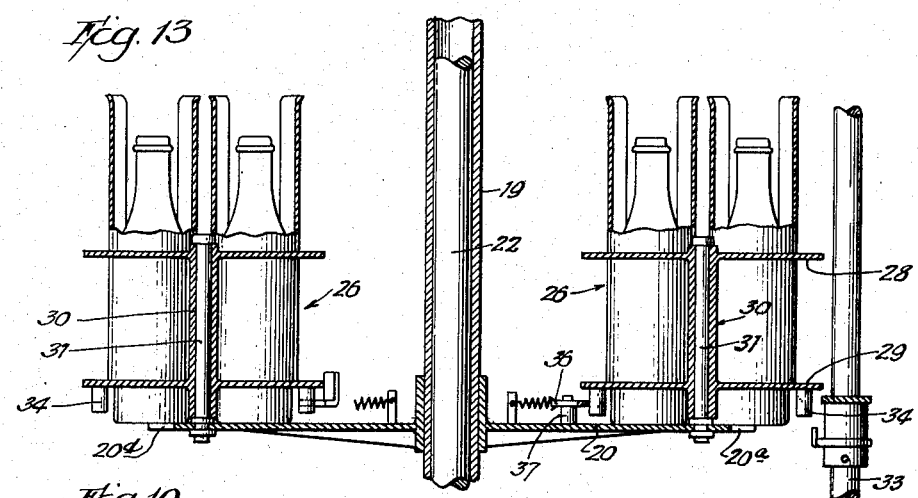
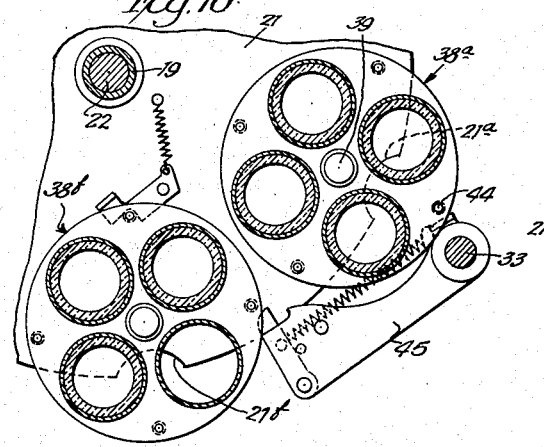
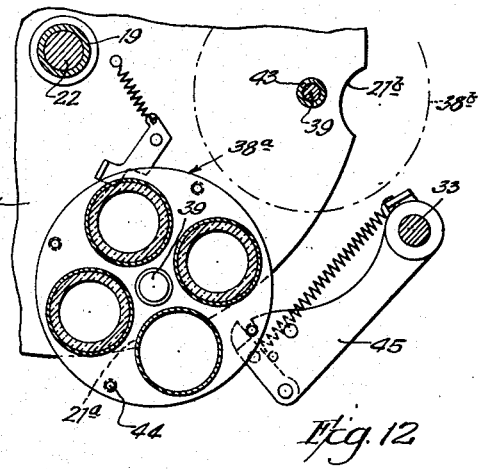
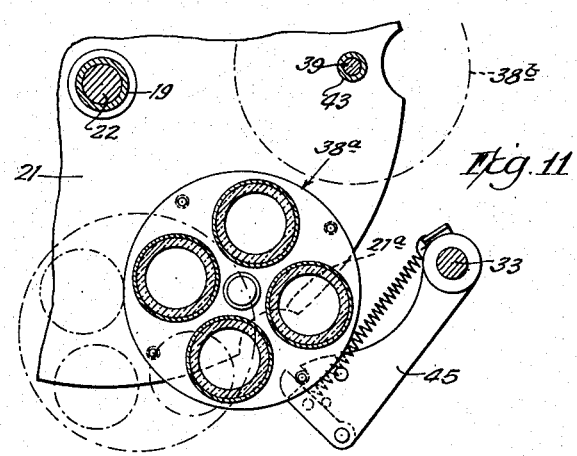
Inventors.
Oscar W. Forslund
William Heyn
BY
Attys.

Feb. 24, 1942.  O. W. FORSLUND ET AL  2,273,948
DISPENSING APPARATUS
Filed June 10, 1940  7 Sheets-Sheet 7

Inventors
Oscar W. Forslund
William Heyn
BY
Sheridan, Davis + Cargill
Attys.

Patented Feb. 24, 1942

2,273,948

UNITED STATES PATENT OFFICE 2,273,948

DISPENSING APPARATUS

Oscar W. Forslund and William Heyn, Chicago, Ill., assignors to Rock-Ola Manufacturing Corporation, Chicago, Ill., a corporation of Delaware Application June 10, 1940, Serial No. 339,716

13 Claims. (Cl. 312—88)

This invention relates to improvements in article dispensing apparatus.

One object of the invention is to provide improved mechanism for dispensing articles such as merchandise containers which may be in the form of bottles, for example, although it will be apparent from a consideration of the following specification that the principle of the invention may be employed in dispensing articles of other types, such as cans, cartons, or the like.

Another object of the invention is to provide dispensing apparatus which holds the articles to be dispensed in closely arranged relation, preferably in two or more planes, whereby a relatively large number of the articles can be stored in the apparatus and dispensed therefrom, one at a time, at a common dispensing location or station.

Another object of the invention is to provide an article supporting structure which is rotatable through a given arc during each dispensing operation and during which operation a small group of the articles only is moved relative to the structure for indexing an article of the group into a dispensing position.

Another object of the invention is to provide apparatus which dispenses therefrom the articles earliest placed in the apparatus whereby the improvements are particularly adapted for use in dispensing bottled beverages when refrigerating means are incorporated in the apparatus, since the coolest bottles, being those that were earliest placed in the apparatus, will be dispensed before those later placed therein are moved into dispensing position.

Other objects of the invention relate to various features of construction and arrangement of parts which will be apparent from a consideration of the following specification and accompanying drawings, wherein—

Figure 1 is a front elevation of a cabinet containing refrigerating means and dispensing apparatus embodying the present improvements;

Figure 2 is a horizontal sectional view taken on line 2—2 of Figure 3;

Figure 4 is a horizontal section through the dispensing apparatus, taken on line 4—4 of Figure 3 illustrating article holders on an upper table of a rotatable carriage;

Figure 5 is a sectional view taken on the line 5—5 of Figure 3 illustrating article holders on a lower table of the carriage;

Figure 6 is an enlarged broken horizontal sectional view illustrating a lower and an associated upper article holder in an initial stage of their article dispensing operations;

Figure 7 is an enlarged broken horizontal section corresponding to Figure 6 but showing the parts in a position wherein the lower holder releases or dispenses an article;

Figure 8 is another progress view advanced from the positions of the holders shown in Figure 7 and showing the relative positions of the holders wherein an article from the upper holder is discharged into the lower holder;

Figure 9 is a view showing the holders in the relative positions at the end of the dispensing operation;

Figures 10, 11 and 12 are progress views of an upper article holder;

Figure 13 is an enlarged, broken, vertical sectional view of a portion of the dispensing mechanism;

Figure 16 is a view illustrating diagrammatically coin controlled means for operating the dispensing apparatus.

Figure 3:
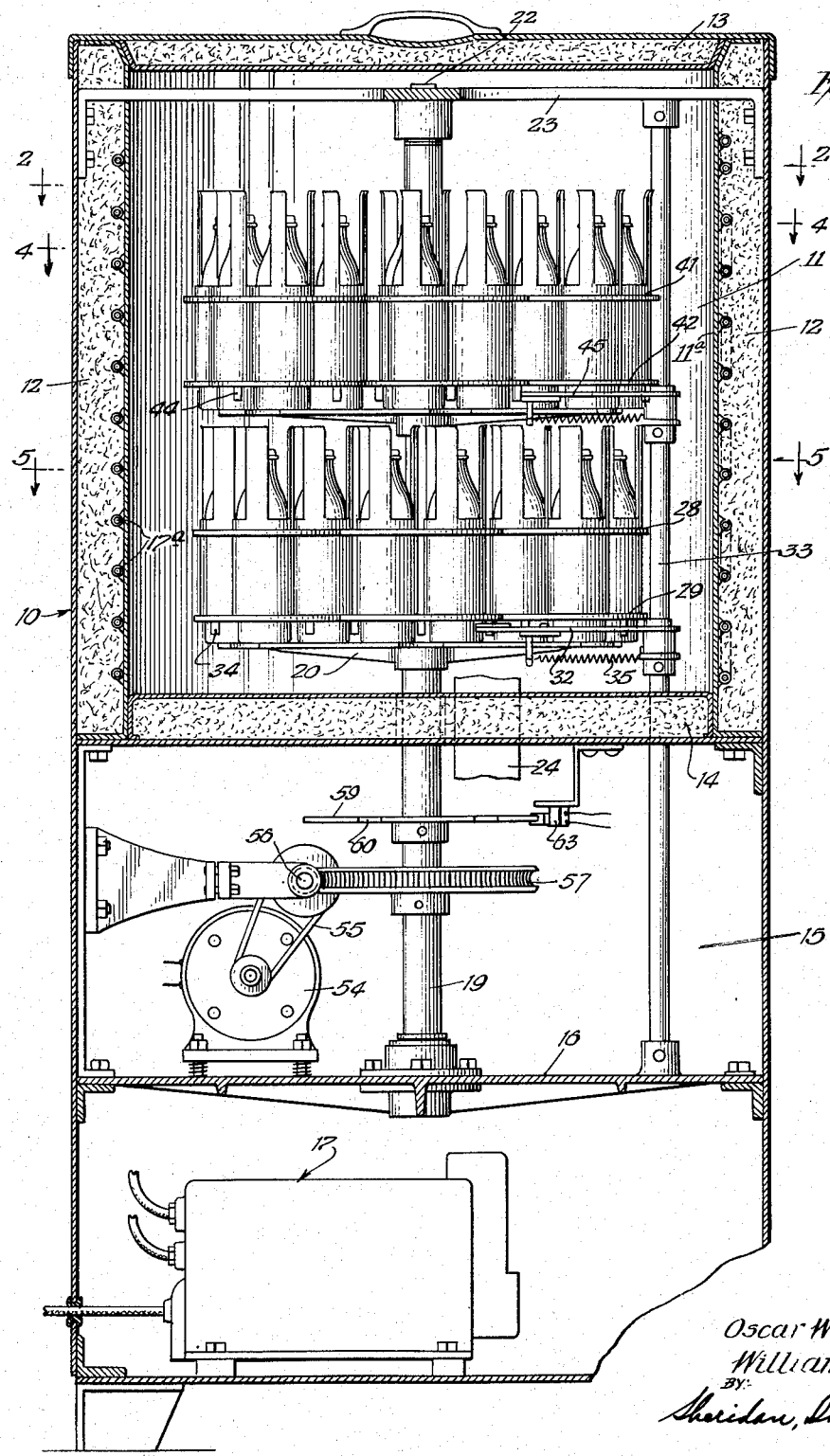
Figure 3 is a vertical section through the cabinet and showing in elevation the article dispensing apparatus therein, as well as indicating more or less diagrammatically the refrigerating mechanism.

Referring to Figures 1 and 2 of the drawings 10 generally indicates a suitable cabinet which houses the dispensing apparatus and which is provided with an upper chamber 11 defined by insulated vertical side walls, an insulated cover and a lower horizontal partition which is also insulated. Beneath the partition is a compartment in which the operating mechanism for the dispenser is located, which mechanism may be mounted on a transverse support 16. Beneath the latter is shown a refrigerator unit indicated generally by numeral 17 which may comprise a conventional motor, compressor and condenser adapted to force refrigerant through the coils 17a which are located on the exterior of the lining of the refrigerating compartment. The refrigerating apparatus per se is no part of the present improvements and need not be further described.

Figure 15:
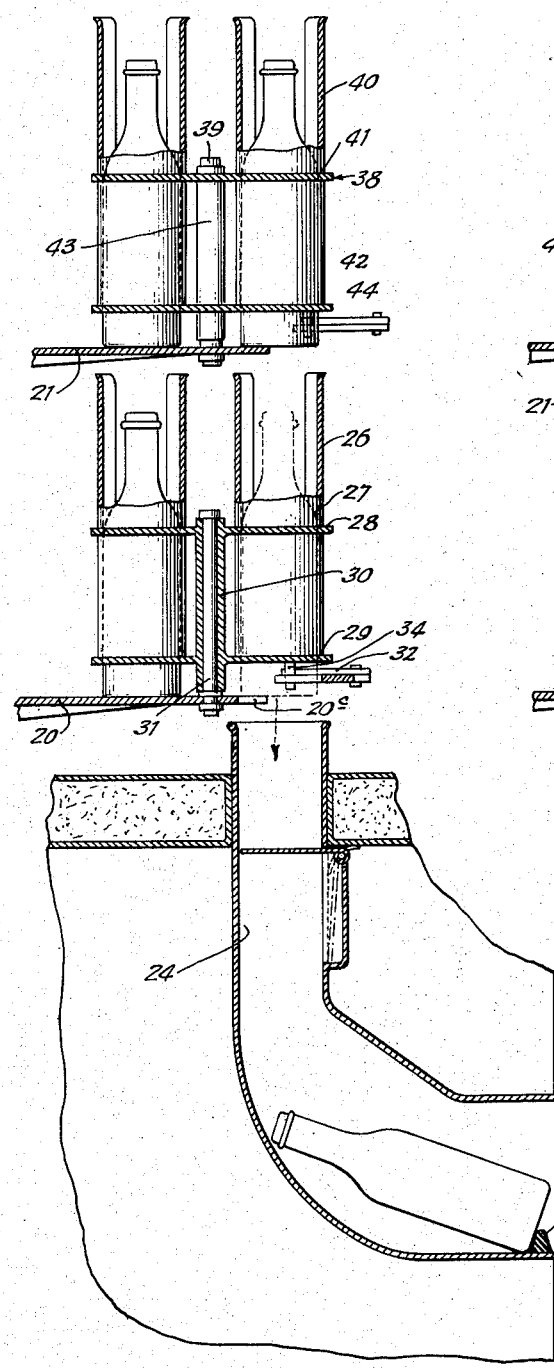
Figure 15 is a view similar to 14 but illustrating the mechanism advanced to the position wherein an article has been discharged into the receiving chute.
Figure 14:
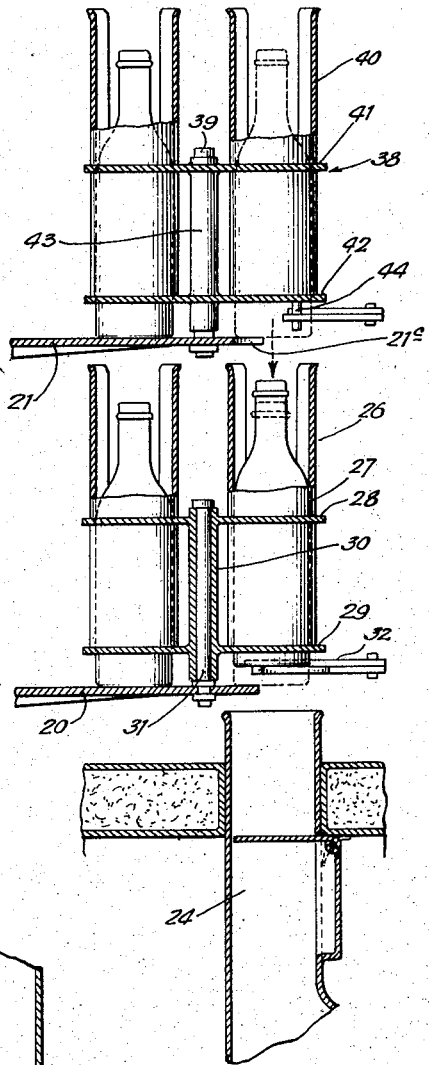
Figure 14 is an enlarged, broken, vertical sectional view illustrating a container or article holding cell thereof moved to a position adjacent the dispensing position and a receiving chute into which an article is about to be discharged.

Rotatably mounted on the support is a hollow vertical shaft 19 which extends through the insulated partition into the chamber and to which is attached, in the embodiment illustrated, two rotatable horizontal supports or turntables 20 and 21. For the purpose of more adequately supporting the rotatable shaft a solid shaft is shown extending through the same and is appropriately attached to the support 16 and to an upper support 23. When the shaft is rotated by means hereinafter described the turntables are also rotated, said tables 20 and 21 constituting the means for supporting the articles to be dispensed. The shaft and turntables and other mechanism hereinafter described thus constitute a carriage for the articles to be dispensed. The carriage is adapted to be rotated through a predetermined arc at each operation thereof to move an article, such as a bottle, in the carriage into a dispensing position whereupon the bottle is released from the carriage and drops into a chute (see Figures 14 and 15) which has an enlarged lower end. The patron who has operated the machine can thus readily remove the bottle, the chute at its outer end being provided with a bumper which arrests the descent of the bottle as shown in Figure 15.

Mounted on the table 20 is a plurality of article holders, each of which is rotatable independently about an individual vertical axis. In the drawings six of these holders are illustrated and each of which comprises four cells, each for holding an article or bottle to be dispensed. The holders above mentioned are indicated generally by the numerals 26, to which are given the exponents a to f, and the cells by numerals 27, to which are given the exponents a to d for the purpose of clarity of description. The four cells 27 of each holder may be in the form of cylindrical containers slotted at the upper ends if desired, as shown, and each supported by two vertically spaced discs 28 and 29 which, in turn, are carried by a sleeve 30 rotatably supported upon a short shaft 31 which is mounted on the table 20. Since six of the holders 26 are shown for the purpose of illustration, the carriage is actuated through an arc of 60 degrees whenever the operating mechanism is energized. Six arcuate movements of the carriage will move the six holders 26 of the table 20 successively to a dispensing station, that is, into a position adjacent the upper end of the chute 24. As each holder approaches the dispensing station it is indexed upon its individual axis or shaft 31 so as to cause one of the cells 27 to register with the chute 24 and effect release of the bottle of said cell into said chute whereby the bottle will gravitate to the position in the lower portion of the chute as indicated in Figure 15. As a particular holder, as just mentioned, approaches the dispensing station on the next complete rotation of the carriage the indexing means above referred to will again rotate that holder upon its axis 31 through another arc of 90 degrees to move another cell 27 into dispensing position.

The indexing means above referred to is shown as comprising a pawl 32 pivotally mounted upon a shaft 33 which, in the embodiment of the invention illustrated, is secured at its opposite ends to the supports 16 and 23. The lower disc 29 of each of the holders is provided with a plurality of downwardly projecting pins 34, each associated with one of the cells 27. Each pin is provided with an exponent a to f for the purpose of identifying it with a particular holder identified by like exponent. The pawl 32 is provided with a spring 35 which tends to swing it in clockwise direction, as viewed in Figure 5, into engagement with one of the pins 34. During such arcuate movement of the carriage the tooth 32a of the pawl will engage one of the pins 34 and cause the rotation of a holder 26 on its individual shaft or axis 31 through an arc of 90 degrees and thus move one of the cells of that holder into dispensing position. It will be noted that the table 20 is provided with six recesses or cut-outs at its periphery identified by reference characters 20a to 20f, inclusive, each associated with the holders 26 identified by the corresponding exponent. The cells 27 normally are in such position that no cell of any holder 26 normally is in registration with the corresponding recess of that holder, but during the indexing movement of a particular holder, by means of the pawl 32, as above referred to, one of the cells of that holder will move into alignment with the corresponding recess whereupon the bottle in the registering cell can drop by gravity into the chute 24. The indexing movement effected by the pawl is sufficient not only to move a cell, such as cell 27a of the holder 26a of Figure 5, into registration with the associated recess whereby the bottle in the registering cell can drop into the chute, but before the continuous 60 degree arcuate movement of the carriage is completed the pawl will move the particular cell beyond that indexed position and into the position occupied in said figure by the cell 27a of the holder 26f. In other words, no cell of any holder normally is in registration with its associated recess but as any particular holder 26 approaches the dispensing station adjacent the chute 24 the pawl moves that holder relatively to the table through an arc of 90 degrees and causes one of the cells thereof to sweep over the associated recess whereby during that period of momentary registration with the recess the bottle in such cell drops by gravity into the chute.

Associated with each holder is a spring pressed pawl 36 pivotally mounted at 37 to the table 20 and arranged to engage one of the pins 34, as shown in Figure 5, for retaining the respective holder in normal position, that is, in the position wherein no cell registers with the respective notch 20a. The tension of the springs of the pawls 36 is adequate to hold the respective holders 26 in their normal positions but yield to enable the respective holder to be indexed as described upon engagement of one of the pins by the pawl 32.

Referring to Figure 5 it will be seen that an upwardly directed pin 32b carried by the pawl 32 is in engagement with the periphery of the lower disc 29 of the holder 26a and guides the pawl so as to cause the tooth 32a thereof properly to engage the pin 34a for indexing the holder as described.

Assume that a coin is inserted in the machine so as to effect rotation of the carriage through an arc of 60 degrees and cause holder 26a to move from the position shown in Figure 5 to the position of holder 26f in said figure. During such movement the tooth 32a of the pawl 32 will engage the pin 34a, see Figures 6, 7, 8 and 9, and thus effect rotation of the holder 26a upon its axis 31 relative to the carriage through an arc of 90 degrees and thus cause the cell indicated by the numeral 27a in said figure to move arcuately and during such arcuate movement to register with the recess 20a (in which position it is shown in Figure 7) whereupon the bottle in cell 27a drops into the chute. Upon the next operation of the carriage in a clockwise direction the succeeding holder 26b moving into engagement with the pawl 32 will likewise be indexed so as to effect the release of a bottle from the cell 27a of that holder as above described. Hence, during each complete rotation of the carriage in the embodiment illustrated six bottles will be dispensed, one from each cell 27a of the respective holders 26a, 26b, etc., and upon the next complete rotation of the carriage six additional bottles will be dispensed, one during each operation of the machine, such bottle being released successively from the cells indicated by reference characters 27b. During the next six successive operations of the machine the cells 27c will deliver bottles successively into the chute, etc.

In the embodiment illustrated it will be seen that upon four complete rotations of the carriage all the bottles would be dispensed from the lower holders above described. However, to increase the bottle holding capacity of the machine, the upper table 21 is provided with a similar group of holders each indicated generally by the numeral 38 having a distinguishing exponent a to f, inclusive, each holder being mounted upon an individual shaft 39 whereby such holders can be indexed to cause the individual cells 40 thereof (each having a distinguishing exponent a–d) to be indexed successively into registration with an associated recess 21a to 21f, inclusive, corresponding to the notches 20a to 20f of the lower table 20.

The upper holders, that is, those supported by the table 21, are, of course, moved arcuately with the carriage also and each such holder is associated with a subjacent holder on the table 20. The cells 40 of the holders 38 are mounted in pairs of upper and lower discs 41 and 42 (see Figure 14) which, in turn, are secured to or form a part of sleeves 43 through which the respective shafts 39 pass. The lower disc 42 of each holder 38 is provided with indexing pins 44 (identified by exponents a to f), as shown in Figure 4, which are adapted to cooperate with a spring pressed pawl 45 also loosely mounted on the shaft 33. The relation of the pins to the associated cells of the holders is shown in Figure 4 wherein the table 21 is shown in a position of rest.

Referring to Figure 4, it will be seen upon completion of the movement of the carriage through an arc of 60 degrees the holder 38a will be moved into the position occupied by holders 38f in said figure. During such movement the pawl 45 will engage the pin 44a and effect rotation of the holder 38a through an arc of 90 degrees as the holder moves toward the position occupied by holder 38f in said figure. During such indexing movement (see Figures 6 to 9) the cell 40a will be moved counter-clockwise through an arc of 90 degrees upon its axis and will sweep into registration with the notch 21a of the table 21 and during the momentary registration of said holder with said notch the bottle in the holder 38a will drop from that holder. The bottle so dropping from the holder 40a passes into the subjacent cell 27a from which, during that same arcuate movement of the carriage, the bottle was dispensed into the chute 24. Since the 60 degree arcuate movement of the carriage will not have been completed at the time a bottle from the upper holder 38a drops into the empty cell 27a of the lower holder 26a, the pawl 32 is provided with an extension 32c which at that instant will be disposed beneath the empty cell 27a and arrests the descent of the bottle entering such cell and prevents the bottle from partially entering the recess 20a which at that instant will not have moved from registration with cell 27a to the maximum extent. As the arcuate movement of the carriage and the indexing movement of the lower holder are completed, the cell 27a is moved out of registration with the associated recess 20a and the bottle resting on the extension 32c drops into contact with the table 20. During the completion of such rotative movement through an arc of 60 degrees of the carriage, the associated spring pressed pawl 46, each of which is pivoted at 47 to the table 21, will engage one of the pins 44 and retain the last indexed upper holder 38 in its normal position, that is, where no cell thereof is in precise registration with the corresponding slot 21a.

Inasmuch as it is desirable to cause a bottle from a lower cell to be dispensed before a bottle from an upper holder is dropped into such lower cell, each of the shafts 31 is set slightly in advance of the corresponding shafts 39, that is, in the direction of rotation of the carriage which is clockwise as viewed in the drawings. Likewise the recesses 20a, etc. are set slightly in advance of the notches 21a, etc. of the corresponding holders. The pawl 32 is arranged to engage one of the pins 34 slightly prior to the time that the pawl 45 engages one of the pins 44 so that a bottle from a lower holder, as above stated, is discharged from the cell before a bottle is released from a cell of the corresponding upper holder. By reason of this offsetting of the vertical shafts of the corresponding upper and lower holders (which shafts, however, are located at the same radial distance from the shaft 19), and the offsetting of the recesses, the cell of a lower holder from which a bottle has been discharged during its movement through an arc of 90 degrees moves into vertical registration with the associated recess of the corresponding upper holder at the instant that the correlated upper cell moves into registration with said upper recess so that a bottle in such upper indexed cell drops directly into the registering cell of a lower holder where, as above stated, it is arrested by the extension 32c on the lower pawl. The bottle drops from the upper into the lower cell, as stated, prior to the completion of the 60 degree movement of the carriage and the balance of such movement is sufficient to move the empty upper cell out of registration with the upper associated recess so that such upper cell will retain a bottle placed therein by an attendant in refilling the carriage. Upon the completion of any such arcuate movement of the carriage the bottle which has dropped into a lower cell will also have been moved off the extension 32c of the pawl 32 and will rest upon the table 20 since at that time that lower cell will have been moved out of exact registration with its associated lower recess.

As the holder 26a continues its 90 degree arcuate movement after the cell 27a thereof has discharged its bottle into the chute, such cell will move into registration with an upper associated recess 21a in the table 21, as shown in Figure 8, and as the holder 26a completes its movement under the action of the pawl 32 it will come to rest as shown in Figure 9. In other words, the position of the holder 26a of Figure 9 indicates that it has been rotated clockwise through an arc of 60 degrees from its position shown in Figure 6, and it will be seen that the cell 27a of the holder 26a has moved from its relative position shown in Figure 6 through an arc of 90 degrees counter-clockwise about its axis from the position shown in Figure 6.

Upon the next arcuate movement of the carriage following that above described, lower holder 26b and upper holder 38b will move into the dispensing station above the chute 24 and the cells 27a and 40a thereof, respectively, will successively release their contents, the former into the chute 24 and the latter into the then empty cell 27a. Upon the third operation of the machine holders 26c and 38c will be moved into the dispensing station over the chute and the bottles in said cells 27a and 38a of said holders will be released as described. During the seventh to the twelfth operation the cells of the respective holders designated by the exponents b will release their bottles and during the following six operations the cells designated by exponent c will release the bottles as described, while during the next six operations the bottles contained in the cells identified by exponents d will be discharged. Hence in the embodiment of the invention disclosed the 24 bottles originally contained in the lower holders will be dispensed during the 24 operations of the machine above described or referred to, and during such operations the 24 bottles of the upper holders will have been transferred, one at a time, during those operations, to the corresponding lower holders.

It will be noted that the bottle last fed from an upper holder into the corresponding lower holder will be the last bottle in said lower holder at any given time to be dispensed therefrom. Likewise, if at any time the cover or lid 22 of the cabinet is opened for replenishing the cells, bottles already in such upper holders will be delivered to lower holders prior to the transfer of the last inserted bottles. Hence by this arrangement a bottle or bottles last inserted in the machine will be the last (with respect to these already there) to be dispensed by the machine and hence will have a greater period for cooling than were the arrangement such that newly inserted bottles could be dispensed prior to those previously inserted.

Referring to Figure 16 of the drawings a conventional coin slide 46, as shown, in which a coin of a proper denomination may be inserted for effecting the operation of the machine, the coin slide 46 being mounted in a wall of the cabinet, as shown in Figure 1. When a coin has been inserted in the coin opening of the slide and the latter pressed inwardly the coin is delivered to and drops into a chute 47 into which projects a flexible contact carrying member 48 which is deflected downwardly by the coin as the latter moves downwardly through the chute. The momentary downward deflection of the member 48 moves contact 49 thereof into circuit closing relation with a contact 50 also carried by a flexible member 51. These contacts are connected by conductors 52 and 53 in a motor circuit and to a suitable source of supply of electrical energy. The momentary closure of the motor circuit through the contacts 49 and 50 energizes a motor 54 which, by means of a belt 55, operates a worm 56 which is in engagement with a worm wheel 57 mounted on the shaft 19. Also secured to the shaft 19 is a disc 59 provided with notches 60 in its periphery, there being six of such notches corresponding to the 60 degree arcuate movement of the carriage during each coin controlled operation thereof. In contact with the periphery of the disc 59 is a flexible contact member 62 associated with a second contact member 63 which are connected by conductors 64 and 65, respectively, with the conductors 52 and 53. The initial energization of the motor which is effected by the momentary closure of the circuits 49 and 50 is sufficient to cause the motor to effect rotation of the disc 59 to force the free end of contact 62 out of one of the notches 60 and effect the closure of the motor circuit through the conductors 64 and 65 whereupon the motor continues the operation until the free end of the contact 62 springs into the next notch 60 of the disc whereupon the motor circuit is opened and the dispensing mechanism brought to rest. By this arrangement it will be seen that the mechanism is operated through the required 60 degrees upon the insertion of a proper coin and during such arcuate movement of the carriage a bottle from a lower holder is automatically dispensed and a bottle from an upper holder is fed into the empty cell of such lower holder.

It will be understood that the disclosure of six holders in each turntable and the movement of the carriage through an arc of 60 degrees during each operation thereof are for illustrative purposes only and that a greater or smaller number of such holders may be employed when the respective turntables are of greater or smaller diameter, respectively, and that where a different number of holders is employed the degrees of arc through which the carriage is moved at each operation will be varied accordingly by an appropriately designed control disc 59.

It will also be observed that the bottles of other merchandise carried by the cells of the holders normally rest on the respective turntables and that only said bottles or containers in the particular cells approaching the dispensing position are caused to slide upon the respective tables as said holders are indexed into dispensing positions by the corresponding pawls. Relatively little power is thus required in operating the dispenser which, of course, may be operated manually if desired by the provision of any suitable mechanism in lieu of the motor operated means illustrated and described.

We claim:

1. Dispensing mechanism comprising a rotatable turntable provided with a plurality of discharge recesses, means for operating the turntable through a given arc, a plurality of holding means each for holding a plurality of articles on said table, said holding means each being movable with respect to said table and each being associated with one of said recesses, and means for moving one of said holding means during each operation of the turntable for moving an article in the respective holder into dispensing relation with respect to the associated recess.

2. Article dispensing apparatus comprising a rotary carriage, a plurality of holders each for a plurality of articles, said holders being supported by the carriage and being independently rotatable with respect thereto, means for rotating the carriage to move said holders successively into an article dispensing zone, means for effecting the release of an article from a holder in a given position within said zone, and means for rotating each of said holders relative to the carriage during each cycle of rotation thereof for moving other articles in the respective holders successively into said given position for release by said means upon movement of the respective holders successively into said dispensing zone.

3. Article dispensing apparatus comprising a rotary carriage, a plurality of article holders carried thereby and each being rotatable relatively thereto for moving articles carried thereby into a given dispensing position relative to the carriage, means for rotating the carriage through a given arc for moving the holders successively into a dispensing zone, dispensing means for effecting the release from a holder of an article in said given position in said zone, and means for rotating each of said holders after the dispensing of an article therefrom for moving additional articles thereof into said given dispensing position for release by said means as the respective holders are moved successively into said zone.

4. Article dispensing apparatus comprising a rotatable carriage, a plurality of independently rotatable article holders on said carriage and provided with a plurality of article holding cells spaced annularly about the axes of the respective holders, means for moving said carriage through annular increments for moving said holders successively into an article dispensing zone, means for effecting the release from a holder in said zone of an article in a cell thereof in a given position within the zone, and means for actuating said holders successively after the dispensing of articles therefrom whereby another cell of each holder will move into said dispensing position as the respective holders are moved successively into said dispensing zone.

5. Article dispensing apparatus comprising a rotatable carriage, a plurality of article holders thereon independently rotatable with respect thereto and provided with a plurality of article holding cells annularly spaced about the axes of the respective holders, means for rotating said carriage by annular increments for moving said holders in succession into a dispensing zone, means for releasing an article from a holder in said zone, and means for actuating said holders successively during said incremental movements of the carriage for moving an article-containing cell of a holder into position for cooperation with said article releasing means as the respective holder moves into said zone.

6. Article dispensing apparatus comprising a rotary carriage, a plurality of co-planar dispensing holders thereon each provided with a plurality of article holding cells and being rotatable about an individual axis, means for rotating said carriage by annular increments for moving successive holders into a dispensing zone, means for moving said holders successively about the respective axes one during each incremental movement of the carriage whereby a cell of each holder is moved into a dispensing position as the respective holders are moved into said zone, means for releasing the articles successively from the cells in said dispensing position, a plurality of article storage holders on the carriage above said dispensing holders, and means operable by the movements of the carriage for effecting the transfer of articles from said storage holders to said cells from which articles have been dispensed.

7. Article dispensing apparatus comprising a rotary carriage, a plurality of dispensing holders thereon each provided with a plurality of annularly arranged article holding cells and being rotatable about an individual axis, means for rotating the carriage by annular increments for moving said holders successively into a dispensing zone, means for effecting the movement of each holder upon its axis during each complete rotation of the carriage for disposing one of the cells thereof in an article dispensing position as the respective holder moves into said zone, means for releasing the articles successively from the cells as the latter move into said dispensing position, a plurality of article storage holders each associated with one of said dispensing holders, and means for effecting the transfer of articles from a storage holder to the empty cells of the associated holder prior to the movement of said empty cells again into said dispensing position.

8. Article vending apparatus comprising a rotatable carriage comprising an article supporting table provided with annularly spaced article dispensing recesses, a plurality of bottomless article holders above said table and each associated with one of said recesses and each comprising a plurality of article holding cells annularly arranged about an individual axis so located that upon rotation of the holder about the axis thereof successive cells thereof are moved into registration with the respective dispensing recess, means for effecting the rotation of said carriage by annular increments for moving said holders successively into a dispensing zone, and means for rotating the holder in said zone for indexing a cell thereof into registration with the respective dispensing recess for effecting the gravitational release of the article from said cell.

9. Article dispensing apparatus comprising a rotary carriage, a chute for dispensed articles having an upper end disposed for receiving articles released from said carriage, a plurality of article holders mounted on the carriage for rotation about an individual axis and provided with means for holding articles in non-dispensing positions thereon, said carriage being provided with an article releasing recess associated with each holder, means for rotating the carriage through predetermined increments for moving successive holders into a position adjacent the upper end of the chute, means for rotating each of said holders about its axis as the holder moves over the upper end of the chute for moving an article therein into registration with the associated article releasing recess.

10. Dispensing apparatus comprising a rotary carriage, a subjacent article chute, said carriage being provided with a plurality of recesses therein adapted to be moved successively into registration with said chute, a plurality of rotary article holders on said carriage each rotatable on an independent axis and provided with a plurality of article cells normally out of registration with the respective recesses, means for rotating the carriage predetermined arcuate distances for moving said recesses in succession into registration with said chute, and means for rotating each article carrier on its axis through such arc as to effect the registration of a cell thereof with the associated recess as the latter moves into registration with said chute.

11. Dispensing apparatus comprising a rotatable carriage, a plurality of article holders carried thereby and each being rotatable independently on said carriage about an individual axis, said holders being provided with a plurality of article holding cells arranged about the respective axis, and means for moving the holders in succession about the respective axes through such arcs as to index one of the cells of each holder into an article dispensing position during each cycle of rotation of the carriage.

12. Article dispensing means comprising a rotatable carriage, a plurality of article holders mounted thereon each for rotation about an individual axis and each provided with a plurality of article holding cells equally spaced from the respective axis, said carriage comprising an article supporting table provided with recesses each spaced from the axis of one of said cells a distance corresponding to the spacing of the cells from the axis of the respective holder whereby the cells thereof are movable successively into registration with the respective recess to effect the gravitational release of articles from such cells, coin controlled means for actuating said carriage through a given arc at each operation thereof, and means for engaging one of said holders at each such operation of the carriage for effecting the movement of said holder about its axis relative to the carriage for moving one of the cells of said holder into registration with the respective recess.

13. Dispensing apparatus comprising a rotatable carriage, a plurality of arcuately spaced article holders carried thereby each movable relative to the carriage and each arranged for holding a plurality of articles to be dispensed, means for moving each of said holders relative to the carriage as the holders are carried by the latter to a given position and means for actuating said carriage through successive arcs for moving said holders into engagement with said holder moving means whereby during each cycle of rotation of the carriage an article is dispensed from each of said holders.

OSCAR W. FORSLUND.
WILLIAM HEYN.